Feb. 13, 1923.

J. A. SPENCER.
PISTON AND STUFFING BOX PACKING.
FILED MAY 1, 1918.

WITNESSES.

INVENTOR.

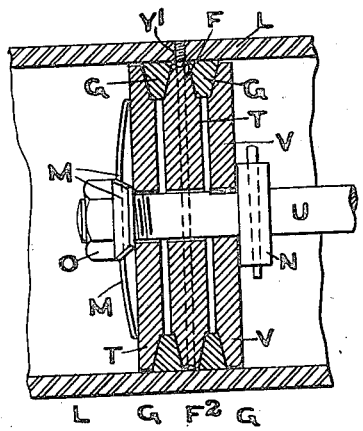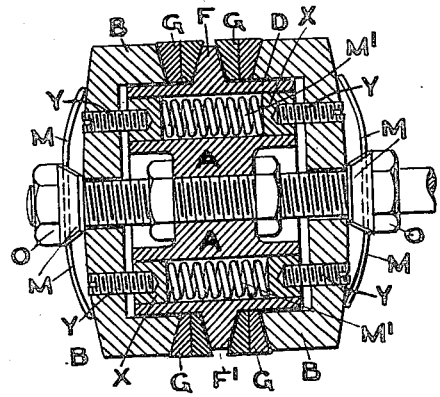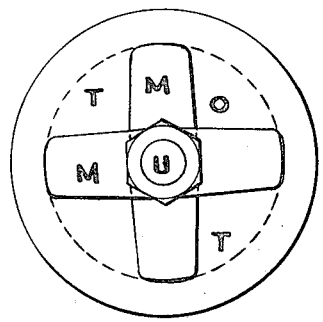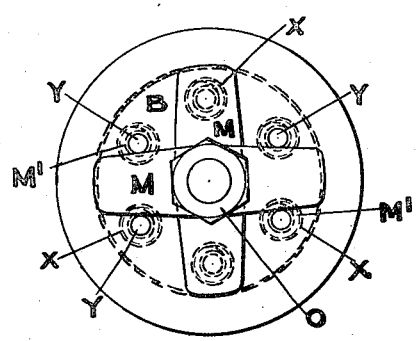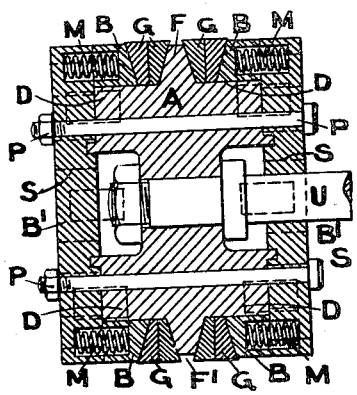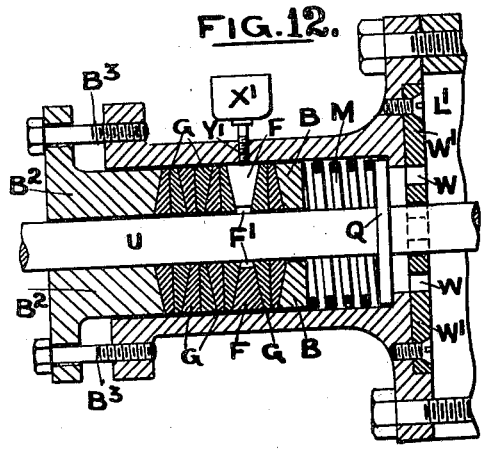

Patented Feb. 13, 1923.

1,444,856

UNITED STATES PATENT OFFICE.

JAMES ARTHUR SPENCER, OF SOUTHALL, ENGLAND.

PISTON AND STUFFING-BOX PACKING.

Application filed May 1, 1918. Serial No. 231,949.

*To all whom it may concern:*

Be it known that I, JAMES ARTHUR SPENCER, a subject of the King of Great Britain, residing at Southall, in the county of Middlesex, England, have invented new and useful Improvements in and Relating to Piston and Stuffing-Box Packings, of which the following is a specification.

This invention relates to pistons, piston rings, glands, stuffing boxes or the like for all kinds of internal combustion engines, steam engines, pumps, air compressors, valves or the like, and the object of my invention is an improved construction of packing therefor whereby such packing is maintained in continuous tension against liner or piston, or both, said tension being further increased in accordance with the pressure put upon the piston or valve by the expanding fluid within or admitted to the cylinder or the like, and for efficiently lubricating the parts in frictional contact. By these means there is no loss during compression or in power, the joint remains a perfectly tight one with an easy working of the parts moving in frictional contact.

My invention consists in the combination of rings of a conical or taper section serving as packing and mounted upon the piston or the like, with a loose head, cap, collar or collars abutting and putting end pressure upon said rings to expand or expand and contract same by means of a spring or springs, or by the expanding fluid, or both, acting upon said head, collar, or collars, or upon the piston. The packing rings are also severed or have a saw-cut on one side running in an oblique direction to allow said rings to be expansible or contractible when pressure is applied as aforesaid. The rings are also so arranged that the cut in one ring does not come opposite the cut in an adjacent ring and grub screws prevent said rings from bringing two cuts into line. Also annular and axial oil ducts are formed in both rings and piston supplied with lubricant in any suitable manner whereby an efficient and continuous lubrication of the parts moving in frictional contact, takes place. The spring or springs employed, their strength and type, the number and taper of the packing rings, the shape of the loose head or collars, and their relative positions may be varied according to requirements.

I attain these objects by the mechanism illustrated in the accompanying drawings in which—

Fig. 7 is a sectional side elevation of my invention applied to steam engines, pumps, air compressors, or the like.

Fig. 8 is an end view of Fig. 7.

Fig. 9 is a sectional side elevation of a modification of Fig. 7.

Fig. 10 is an end view of Fig. 9.

Fig. 11 is a sectional side elevation of a further modification of my invention applicable to either internal combustion engines, steam engines, pumps, air compressors or the like.

Fig. 12 is a sectional side elevation showing my invention applied to glands stuffing-boxes or the like.

Similar letters refer to similar parts throughout the several views.

Figure 1:
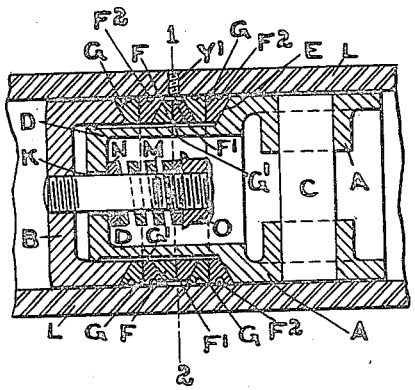
Fig. 1 is a sectional elevation of my invention applied to pistons of internal combustion engines.
Figure 2:
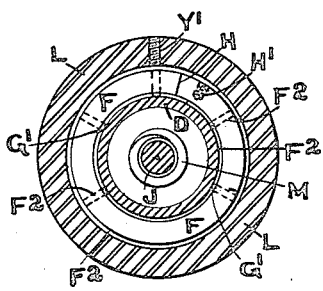
Fig. 2 is a sectional end view of Fig. 1 through the line 1.2.
Figure 3:
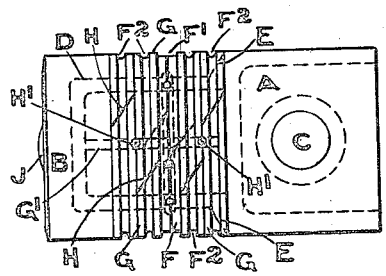
Fig. 3 is a plan view of my invention shown at Fig. 1.

In applying my invention to internal combustion engines, see Figs. 1, 2 and 3, I construct the piston of two parts A, B. The main portion A, to which is secured the connecting rod at C, has a reduced part D connected by a tapered shoulder E. Fitting upon the part D is preferably a combination of conical or tapered piston rings F, G. All the rings have a saw cut H on one side obliquely to the axis, see Fig. 3 so as to permit of their expansion or contraction, and screws H' screwing into said rings where they contact prevent the said cuts of any two rings getting into line. The rings G conical in section are preferably divided or split at right angles to their axis into two parts leaving the taper sides on the outside. The tapered sides of each ring abuts against similar sides of the adjacent rings and all are clamped between the shoulder E and the part B, the latter fitting upon the part D and is secured by a bolt or bolts J passing loosely through a hole K in the end of D and screwing into B. The part B and rings F G are held in continuous tension, the latter against both piston and liner by a strong spring M between a fast collar N and an adjustable nut O upon the bolt J. By these means any increase in pressure within the cylinder, set up by the explosion of the fuel, acts upon the part B which is pressed against the rings causing the rings G to expand and the rings F to contract according to the number employed, thereby effecting a tight joint between rings and liner and between rings and piston, which prevents any loss in compression or power.

Figure 4:
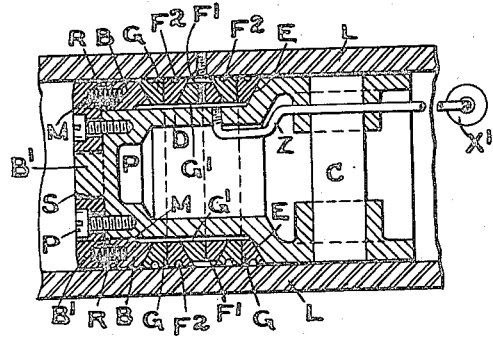
Fig. 4 is a modification of Fig. 1.
Figure 5:
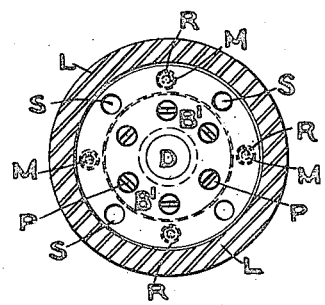
Fig. 5 is an end view of Fig. 4.
Figure 6:
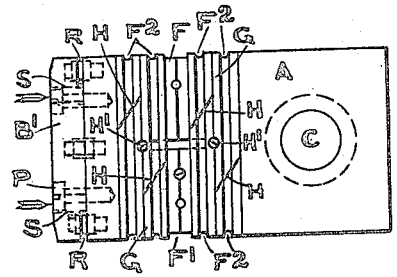
Fig. 6 is a plan view of my invention shown at Fig. 4.

As a modification, see Figs. 4, 5 and 6 the part B is constructed of two parts consisting of the loose head or collar B in contact with the rings, and a plate B' secured to the former by set screws P. The springs M are arranged and fitted within corresponding recesses in B and B', and are each protected from the expanding fluid by a tube R. Tension upon the springs for keeping the rings G against the liner is set up and maintained by their compression on attachment of the plate B' to B, whilst the pressure of the exploding gases acts upon the part B through perforations S, in the plate B', which may be of any desired number and size as found necessary.

For steam engines, pumps, or the like, see Figs. 7 and 8, the piston may be built up of a number of discs TT, fitting loose on the piston rod U, one disc V I preferably key thereon. The discs are grooved to receive the rings G and both discs and rings are clamped between a collar N fast on the rod U and springs M and nut O. The discs are held a suitable distance apart by the rings to allow of their compression, and the necessary expansion of said rings is effected by the springs M and is adjustable by the screwing or unscrewing of the nut O, or it may be correspondingly increased by steam pressure acting upon the piston in the manner before described.

As a modification of my invention as shown and described with reference to Figs. 7 and 8, I again construct the piston in two parts A, B, see Figs. 9 and 10, the parts B being duplicated and fitted upon each end of the piston upon reduced portions D at each side of what in this case serves as the solid tapered ring F but which forms part of A. Between the loose heads or collars B and ring F is mounted one or more of the before described split rings G, the normal tension for keeping such rings against the liner is maintained by blade springs M controlled by nuts O on piston rod U, whilst any additional pressure upon the parts B by the expanding fluid, is cushioned or more or less absorbed by the sliding plungers X carried by screws Y in the parts B acting upon springs M' within corresponding recesses in the part A.

In pistons adaptable either for internal combustion engines or for steam engines, pumps or the like, see Fig. 11, I again form the piston in three parts A, B, and B' with B fitting upon a reduced portion of A and acting upon the rings F and G substantially as shown and described with reference to Figs. 9 and 10. In this case however each part B is held in position by the plate B' part being lipped into the piston A and secured by the bolts P. The necessary tension or end pressure upon the rings G for holding the same in contact with the liner is obtained by the compression of the springs M within corresponding recesses in B and B'. The additional pressure of the expanding fluid also impacts against B through the holes S in B'.

When applying my invention to stuffing-boxes or the like, see Fig. 12, the spring M is preferably situated between the loose collar B on the piston rod and a further loose collar Q near the cylinder end L', whilst the rings F and G are placed between said collar B and the gland B². The spring maintains the required normal end pressure upon the rings which may adjusted by the bolts or set screws B³ controlling the gland. Any additional pressure by the expanding fluid acts upon the collar Q after passing through holes W in a plate or the like W' recessed into cylinder end, the spring M providing the desired cushion and absorbs the shock of impact. Or springs may be placed between B and Q with their ends fitting recesses in each as shown at Fig. 11, and Q may also have holes giving the fluid access to B as in Fig. 11, if desired.

The ring F is in each case reduced in diameter or enlarged in the bore so as to leave a space F' between the ring and liner or between the ring and piston rod, to serve as an oil chamber which may be fed from an oil cup as shown at Fig. 12 or by other means attached to the cylinder at Y' see Figs. 1, 2, 3 and 7. Or the oil supply may be conducted by a pipe Z placed along the inside of the piston, see Fig. 4, to said chamber or to any other part of the piston for lubrication, with the cup X' situated above the level of such parts. Additional oil ducts F² are also provided communicating with said oil chamber, formed both in rings F and circumferentially on rings G and piston A with axial interesecting ducts G' as shown more particularly at Figs. 1, 2 and 4, whereby the parts moving in frictional contact are thoroughly lubricated.

What I claim as my invention and desire to secure by Letters Patent is:—

Piston packing comprising, in combination, a piston formed in two parts, one of said parts having a reduced end portion connected by a tapered shoulder, a plurality of rings conical in section on the reduced portion and being saw-cut on one side adapted to be arranged between the tapered shoulder and the corresponding end of the second part of the piston slidably mounted upon and embracing the first part, a bolt screwing into said head, a spring and nut within the piston adapted to act on the bolt whereby pressure is applied to the piston rings, as and for the purpose specified.

In testimony whereof I have signed my name to this specification in the presence of two subscribing witnesses.

JAMES ARTHUR SPENCER.

Witnesses:
 EDGAR WALTER BALL,
 JOHN ELI STOTT.